(12) United States Patent
Li et al.

(10) Patent No.: US 11,991,684 B2
(45) Date of Patent: May 21, 2024

(54) DATA TRANSMISSION METHOD AND APPARATUS

(71) Applicant: HUAWEI TECHNOLOGIES CO., LTD., Shenzhen (CN)

(72) Inventors: Xinxian Li, Shanghai (CN); Jinlin Peng, Shanghai (CN); Hao Tang, Shanghai (CN); Guohua Zhou, Shanghai (CN); Zhenfei Tang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 529 days.

(21) Appl. No.: 17/241,434

(22) Filed: Apr. 27, 2021

(65) Prior Publication Data

US 2021/0250966 A1    Aug. 12, 2021

Related U.S. Application Data

(63) Continuation of application No. PCT/CN2019/111898, filed on Oct. 18, 2019.

(30) Foreign Application Priority Data

Oct. 31, 2018    (CN) .......................... 201811285326.8

(51) Int. Cl.
*H04W 72/12* (2023.01)
*H04W 72/0446* (2023.01)
*H04W 72/1263* (2023.01)
*H04W 72/20* (2023.01)

(52) U.S. Cl.
CPC ... *H04W 72/1263* (2013.01); *H04W 72/0446* (2013.01); *H04W 72/20* (2023.01)

(58) Field of Classification Search
CPC ......... H04W 72/1263; H04W 72/0446; H04W 72/20; H04W 72/1215; H04W 72/0453; H04L 5/0044; H04L 5/0048; H04L 5/005; H04L 5/0051; H04L 5/0078; H04L 5/0057

See application file for complete search history.

(56) References Cited

U.S. PATENT DOCUMENTS

2014/0369242 A1* 12/2014 Ng ........................ H04L 5/001
                                                        370/280
2017/0265166 A1*  9/2017 Hosseini ............... H04W 72/30
(Continued)

FOREIGN PATENT DOCUMENTS

| CN | 1953349   A | 4/2007 |
| CN | 103167549  A | 6/2013 |
| CN | 106797280  A | 5/2017 |

(Continued)

*Primary Examiner* — Jamal Javaid
(74) *Attorney, Agent, or Firm* — Rimon PC

(57) ABSTRACT

This application provides a data transmission method and a related apparatus. The method includes determining, by a first node, a transmission periodicity, where the transmission periodicity includes a first time unit and a second time unit. In the transmission periodicity, data of a first service is transmitted in only the first time unit, and a physical signal is transmitted in the second time unit. The method further includes transmitting, by the first node, the data of the first service in the first time unit, and/or transmitting the physical signal in the second time unit.

17 Claims, 3 Drawing Sheets

(56) References Cited

U.S. PATENT DOCUMENTS

2018/0070369 A1   3/2018  Papasakellariou
2018/0110056 A1   4/2018  Zhang et al.

FOREIGN PATENT DOCUMENTS

| CN | 107295668 A | 10/2017 |
|----|-------------|---------|
| CN | 108076515 A | 5/2018 |
| EP | 3282624 A1 | 2/2018 |
| WO | 2018129325 A1 | 7/2018 |
| WO | 2018175420 A1 | 9/2018 |
| WO | 2018175709 A1 | 9/2018 |

* cited by examiner

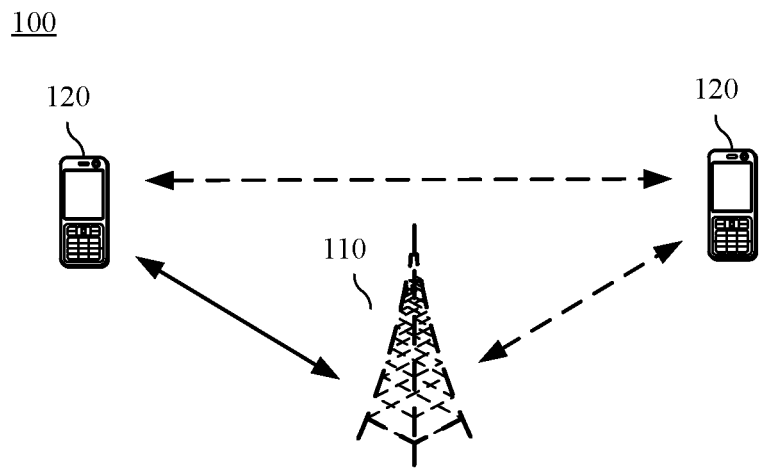

A first node determines a transmission periodicity, where the transmission periodicity includes a first time unit and a second time unit, data of a first service is transmitted in the first time unit, and a physical signal is transmitted in the second time unit — S210

The first node transmits the data of the first service in the first time unit, and/or transmits the physical signal in the second time unit — S220

FIG. 2

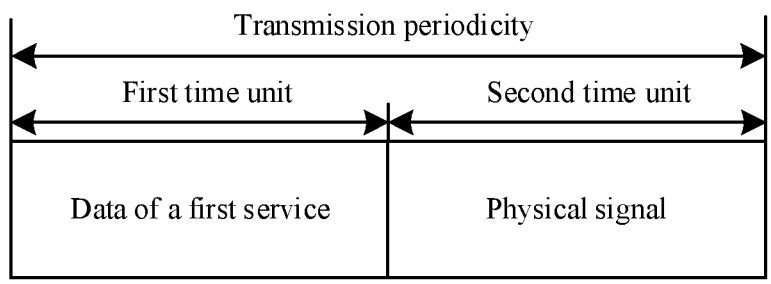

FIG. 3

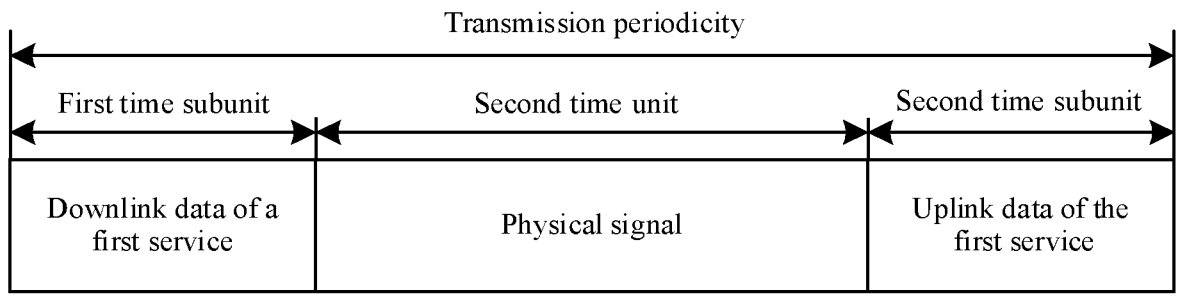
FIG. 4
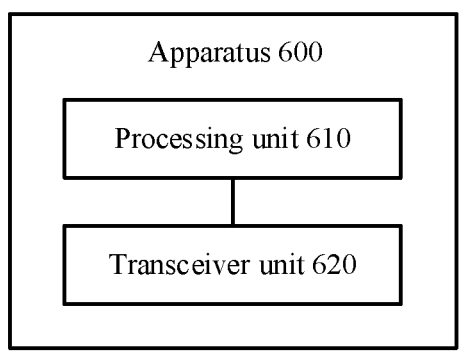
FIG. 5
FIG. 6

DATA TRANSMISSION METHOD AND APPARATUS

CROSS-REFERENCE TO RELATED APPLICATIONS

This application is a continuation of International Application No. PCT/CN2019/111898, filed on Oct. 18, 2019, which claims priority to Chinese Patent Application No. 201811285326.8, filed on Oct. 31, 2018. The disclosures of the aforementioned applications are hereby incorporated by reference in their entireties.

TECHNICAL FIELD

This application relates to the communications field, and in particular, to a data transmission method and apparatus in the communications field.

BACKGROUND

In conventional communication transmission, concepts such as a frame, a subframe, and a slot are well defined in a communication system. For example, in new radio (NR), a length of one frame may be defined as 10 ms, one frame may include 10 subframes, a length of one subframe may be defined as 1 ms, one subframe may include several slots, and one slot may include 14 symbols or 12 symbols. A network device schedules a terminal device by using a slot as a minimum unit for data transmission. A reference signal, a slot format, a subcarrier spacing, and the like may be defined and configured using the slot as a minimum unit. The slot format is configured by the network device for the terminal device using higher layer signaling or physical layer signaling.

With development of technologies, some services have relatively high requirements on data transmission reliability. For example, such services include industrial Internet services and a service applied to a vehicle to X (V2X) communications system (for example, a vehicle-to-vehicle (V2V) communications system, a vehicle-to-infrastructure (V2I) communications system, or a vehicle-to-pedestrian (V2P) communications system), where X indicates everything. Therefore, how to improve the data transmission reliability becomes an urgent technical problem to be solved.

SUMMARY

This application provides a data transmission method and apparatus, to help improve data transmission reliability.

According to a first aspect, a data transmission method is provided. In the method, a first node determines a transmission periodicity, where the transmission periodicity includes a first time unit and a second time unit, data of a first service is transmitted only in the first time unit, and a physical signal is transmitted in the second time unit. The first node transmits the data of the first service in the first time unit, and/or transmits the physical signal in the second time unit.

According to the data transmission method in this embodiment of this application, the transmission periodicity for scheduling data transmission is divided into the first time unit and the second time unit, and the data of the first service is transmitted only in the first time unit, so that the data of the first service can be exclusively transmitted in a period of time, interference caused by another signal to the data of the first service is reduced as much as possible, thereby helping improve data transmission reliability.

With reference to the first aspect, in some implementations of the first aspect, the first time unit and the second time unit do not overlap in time domain. In other words, the first time unit and the second time unit do not include a same symbol in time domain.

The transmission periodicity may be understood as transmission duration, for example, may be a cyclic time (CT) or a plurality of CTs in the industrial Internet. This is not limited in this embodiment of this application. Generally, a length of the CT may be a predefined or preconfigured specific time length. For example, the length of the CT may be a value in a range of 0.25 ms to 2 ms, and a size of a service packet that can be transmitted in one CT may be a value in a range of 64 bytes to 1500 bytes. It should be understood that the transmission periodicity is merely a time segment in a data transmission process, and is not a specific time segment. For example, there are three transmission periodicities in time domain, which are respectively referred to as a first transmission periodicity, a second transmission periodicity, and a third transmission periodicity. In this case, there may be at least one transmission periodicity in the three transmission periodicities, and the at least one transmission periodicity includes a first time unit and a second time unit. Further, each of the three transmission periodicities may include the first time unit and the second time unit, the data of the first service may be transmitted not only in the first time unit in the first transmission periodicity, and the data of the first service may also be transmitted in the first time unit in the second transmission periodicity and/or the first time unit in the third transmission periodicity.

In this embodiment of this application, that the data of the first service is transmitted only in the first time unit means that the data of the first service is transmitted only in the first time unit in the transmission periodicity. It may be understood that a transmission behavior of the data of the first service beyond the transmission periodicity is not limited in this embodiment of this application. In other words, the data of the first service may be transmitted in a time unit beyond the transmission periodicity.

The first time unit and the second time unit each include several symbols. To be specific, the first time unit and the second time unit each may be an integer quantity of slots, or may be a fractional quantity of slots including an integer quantity of symbols, or may be an absolute time segment including an integer quantity of symbols, for example, 0.25 ms. This is not limited in this embodiment of this application.

In addition, the data of the first service may include data carried on at least one of the following physical channels: a first physical downlink shared channel (PDSCH), a first physical downlink control channel (PDCCH), a first physical uplink shared channel (PUSCH), or a first physical uplink control channel (PUCCH). For example, the data of the first service may include data carried on the first PDSCH and/or data carried on the first PDCCH. For another example, the data of the first service may include data carried on the first PUSCH and/or data carried on the first PUCCH. For still another example, the data of the first service may include data carried on the first PDSCH and/or data carried on the first PDCCH, and data carried on the first PUSCH and/or data carried on the first PUCCH. This is not limited in this embodiment of this application.

With reference to the first aspect, in some implementations of the first aspect, the first time unit may be used to transmit only the data of the first service, or transmit the data of the first service and a demodulation reference signal (DMRS), where the DMRS is used by a receiving node to demodulate the data of the first service. In this way, in the first time unit, more time domain resources may be used to transmit the data of the first service. This helps reduce a transmission time of the data of the first service, thereby reducing a transmission latency. In addition, this helps reduce a time required for data retransmission and obtain more retransmission times, so that the data transmission reliability is improved.

With reference to the first aspect, in some implementations of the first aspect, when the data of the first service is transmitted in the first time unit in the transmission periodicity, a time domain resource occupied by the data of the first service may cross a slot boundary. In this way, the transmission latency is reduced, and data transmission efficiency is improved.

With reference to the first aspect, in some implementations of the first aspect, the first time unit in the transmission periodicity includes at least one slot, and the at least one slot may have the following characteristics: There may be more than two switching points in one slot, and the switching points may be used for switching from an uplink symbol to a downlink symbol, and/or switching from a downlink symbol to an uplink symbol. In this way, uplink and downlink data can be more flexibly transmitted between nodes, thereby improving the data transmission efficiency.

In a possible implementation, transmission of the data of the first service and transmission of the physical signal are completely separated in time domain, thereby further avoiding interference from the physical signal to the data, and improving the data transmission reliability. In other words, the data of the first service is transmitted only in the first time unit, the physical signal is transmitted only in the second time unit, and the physical signal may be located at any position in the second time unit. For example, the physical signal is located at a start of the second time unit, at an end of the second time unit, or at the start and the end of the second time unit. This is not limited in this embodiment of this application either.

With reference to the first aspect, in some implementations of the first aspect, the method further includes: The first node receives first configuration information, where the first configuration information is used to configure at least one of the following: a length of the transmission periodicity, and a position of the first time unit in the transmission periodicity or a position of the second time unit in the transmission periodicity.

Optionally, a time sequence relationship between the first time unit and the second time unit may be predefined or preconfigured. For example, in one transmission periodicity, the first time unit or the second time unit may be consecutive or inconsecutive in time domain. For another example, in one transmission periodicity, the time sequence relationship between the first time unit and the second time unit may be (in a time sequence): the first time unit and the second time unit; or the first time unit, the second time unit, and the first time unit; or the first time unit, the second time unit, the first time unit, and the second time unit.

With reference to the first aspect, in some implementations of the first aspect, the first time unit includes a first time subunit and a second time subunit, the first time subunit is used to transmit downlink data of the first service, and the second time subunit is used to transmit uplink data of the first service.

It should be understood that "transmit" in the embodiments of this application should be flexibly understood. To be specific, "transmit" sometimes has a meaning of "sending", and sometimes has a meaning of "receiving". When the first node is a terminal device, the terminal device may receive the downlink data of the first service in the first time subunit, and may send the uplink data of the first service in the second time subunit; and when the first node is a network device, the network device may send the downlink data of the first service in a first sub-time segment, and may receive the uplink data of the first service in a second sub-time segment.

It should be further understood that there may be one or more first time subunits. This is not limited in this embodiment of this application. When there are a plurality of first time subunits, the plurality of first time subunits may be consecutive in the first time unit, or may be inconsecutive in the first time unit. This is not limited in this embodiment of this application either. Similarly, there may be one or more second time subunits. When there are a plurality of second time subunits, the plurality of second time subunits may be consecutive in the first time unit, or may be inconsecutive in the first time unit.

Further, a length of the first time unit may be equal to a length of the second time unit, and a length of the first time subunit may be equal to a length of the second time subunit.

With reference to the first aspect, in some implementations of the first aspect, the first configuration information is further used to configure a position of the first time subunit and/or a position of the second time subunit.

With reference to the first aspect, in some implementations of the first aspect, the method further includes: The first node receives second configuration information, where the second configuration information is used to configure the position of the first time subunit and/or the position of the second time subunit.

In this embodiment of this application, information used to configure the position of the first time subunit and/or the position of the second time subunit may be included in the first configuration information, or may be included in the additional second configuration information. This is not limited in this embodiment of this application.

With reference to the first aspect, in some implementations of the first aspect, the physical signal includes at least one of the following signals: a demodulation reference signal (DMRS), a sounding reference signal (SRS), a signal carried on a physical random access channel (PRACH), a synchronization signal, a phase tracking reference signal PTRS, or a channel state information reference signal (CSI-RS).

Specifically, the synchronization signal may alternatively be a synchronization signal block. There may be a plurality of possible combinations of the foregoing physical signals. For example, the signals included in the physical signal may be the DMRS, the SRS, the signal carried on the PRACH, the synchronization signal, the PTRS, and the CSI-RS. In this way, in a possible implementation, all physical signals are transmitted in the second time unit, and the first time unit is used to transmit only the data of the first service, so that a quantity of time domain resources used to transmit the data of the first service can be increased. In another possible implementation, the first time unit is used to transmit the data of the first service and some DMRSs used for data demodulation, so that a quantity of time domain resources used to transmit the data of the first service can also be increased. For another example, the signals included in the physical signal may be the SRS, the signal carried on the PRACH, the synchronization signal, the PTRS, and the CSI-RS, and all DMRSs used for demodulating the data of the first service may be transmitted in the first time unit. In this way, demodulation performance of the data of the first service in the first time unit can be better ensured.

With reference to the first aspect, in some implementations of the first aspect, the second time unit is further configured to transmit the data of the second service, that is, the first node may transmit the data of the second service and the physical signal in the second time unit.

The data of the second service may include data carried on at least one of the following physical channels: a second PDSCH, a second PDCCH, a second PUSCH, or a second PUCCH. For example, the data of the second service may include data carried on the second PDSCH and/or data carried on the second PDCCH. For another example, the data of the second service may include data carried on the second PUSCH and/or data carried on the second PUCCH. For still another example, the data of the second service may include data carried on the second PDSCH and/or data carried on the second PDCCH, and data carried on the second PUSCH and/or data carried on the second PUCCH. This is not limited in this embodiment of this application.

For example, in this embodiment of this application, data carried on different PDCCHs may be scrambled using different radio network temporary identifiers (RNTI). For example, the data carried on the first PDCCH may be scrambled using a first RNTI, and the data carried on the second PDCCH may be scrambled using a second RNTI.

In addition, for example, different PDSCHs may occupy different quantities of symbols in time domain. For example, in a data transmission process, non-slot based scheduling is used for the data carried on the first PDSCH, and a minimum quantity of scheduling symbols in one data transmission may be two, four, or seven. In this way, the first PDSCH occupies two, four, or seven symbols in time domain. Slot based scheduling is used for the data carried on the second PDSCH, and a minimum quantity of scheduling symbols in one data transmission may be 14. In this way, the second PDSCH occupies 14 symbols in time domain. It may be understood that the quantities of symbols occupied by the first PDSCH and the second PDSCH in time domain are merely examples. A specific quantity of symbols occupied by the first PDSCH and a specific quantity of symbols occupied by the second PDSCH in time domain are not limited in this embodiment of this application.

With reference to the first aspect, in some implementations of the first aspect, the physical signal is used to transmit the data of the first service and/or transmit the data of the second service.

Specifically, a physical signal is transmitted in a second time unit in a transmission periodicity. The physical signal may be used to transmit data of a first service in the transmission periodicity; or may be used to transmit data of a second service in the transmission periodicity; or may be not only used to transmit data of a first service in the transmission periodicity, but also used to transmit data of a second service in the transmission periodicity. This is not limited in this embodiment of this application.

For example, the physical signal transmitted in the second time unit in the transmission periodicity is a DMRS. The DMRS may be used to demodulate the data of the first service in the transmission periodicity; or may be used to demodulate the data of the second service in the transmission periodicity; or may be not only used to demodulate the data of the first service in the transmission periodicity, but also used to demodulate the data of the second service in the transmission periodicity.

For another example, the physical signal transmitted in the second time unit in the transmission periodicity is a CSI-RS. A channel measurement result based on the CSI-RS may be used to transmit the data of the first service in the transmission periodicity; or may be not only used to transmit the data of the second service in the transmission periodicity, but also used to transmit the data of the second service in the transmission periodicity. In the foregoing two cases, the second time unit is located before the first time unit in time domain. Alternatively, the channel measurement result based on the CSI-RS may be used to transmit the data of the second service in the transmission periodicity.

With reference to the first aspect, in some implementations of the first aspect, the second time unit corresponds to a parameter set, and the parameter set includes a parameter used to transmit the physical signal, and a parameter used to transmit the data of the first service or a parameter used to transmit the data of the second service; and the transmitting the physical signal in the second time unit includes: transmitting, by the first node, the physical signal and the data of the second service in the second time unit based on the parameter set.

Specifically, the second time unit may be configured to correspond to the parameter set, where the parameter set may include the parameter used to transmit the physical signal and the parameter used to transmit the data of the first service, or the parameter set may include the parameter used to transmit the physical signal and the parameter used to transmit the data of the second service. The first node may transmit the physical signal and the data of the second service in the second time unit based on the parameter set. To be specific, the first node may transmit the physical signal in the second time unit based on the parameter used to transmit the physical signal, and transmit the data of the second service based on the parameter used to transmit the data of the first service or the parameter used to transmit the data of the second service.

Optionally, the parameter set is also referred to as a numerology. It should be understood that a numerology is a set of parameters used for communication between nodes in a communications system. The communications system (for example, 5G) may support a plurality of numerologies. The numerology may include a subcarrier spacing, a cyclic prefix (CP), a unit of time, bandwidth, and the like. For example, the numerology may include the subcarrier spacing and the CP.

It should be understood that there may be one or more parameter sets. When a plurality of parameter sets are configured, different time segments in the second time unit may respectively correspond to different parameter sets. The foregoing correspondences between different time segments and different parameter sets may be predefined or preconfigured. The first node may perform data transmission in a specific time segment by using a parameter set corresponding to the time segment.

With reference to the first aspect, in some implementations of the first aspect, the parameter set includes a first parameter set and a second parameter set, and the second time unit includes a third time subunit and a fourth time subunit; and the third time subunit corresponds to the first parameter set, and the fourth time subunit corresponds to the second parameter set; and the first parameter set includes the parameter used to transmit the data of the first service and the parameter used to transmit the physical signal, and the second parameter set includes the parameter used to transmit the data of the second service and the parameter used to transmit the physical signal; and the transmitting the physical signal in the second time unit includes: transmitting, by the first node, the physical signal in the third time subunit based on the first parameter set; and the method further includes: The first node transmits the data of the second service in the fourth time subunit based on the second parameter set.

It should be understood that there may be one or more third time subunits. This is not limited in this embodiment of this application. When there are a plurality of third time subunits, the plurality of third time subunits may be consecutive in the second time unit, or may be inconsecutive in the second time unit. This is not limited in this embodiment of this application either. Similarly, there may be one or more fourth time subunits. When there are a plurality of fourth time subunits, the plurality of fourth time subunits may be consecutive in the second time unit, or may be inconsecutive in the second time unit.

According to a second aspect, another data transmission method is provided. The method includes: A network device determines a transmission periodicity, where the transmission periodicity includes a first time unit and a second time unit, data of a first service is transmitted only in the first time unit, and a physical signal is transmitted in the second time unit; and the network device transmits the data of the first service in the first time unit, and/or transmits the physical signal in the second time unit.

According to the data transmission method in this embodiment of this application, the transmission periodicity for scheduling data transmission is divided into the first time unit and the second time unit, and the data of the first service is transmitted only in the first time unit, so that the data of the first service can be the only data/signal transmitted in a period of time, interference caused by another signal with the data of the first service is reduced as much as possible, thereby helping improve data transmission reliability.

With reference to the second aspect, in some implementations of the second aspect, the method further includes: The network device sends first configuration information, where the first configuration information is used to configure at least one of the following: a length of the transmission periodicity, a position of the first time unit in the transmission periodicity, or a position of the second time unit in the transmission periodicity.

With reference to the second aspect, in some implementations of the second aspect, the first time unit includes a first time subunit and a second time subunit, the first time subunit is used to transmit downlink data of the first service, and the second time subunit is used to transmit uplink data of the first service.

With reference to the second aspect, in some implementations of the second aspect, the first configuration information is further used to configure a position of the first time subunit and/or a position of the second time subunit.

With reference to the second aspect, in some implementations of the second aspect, the method further includes: The network device sends second configuration information, where the second configuration information is used to configure the position of the first time subunit and/or the position of the second time subunit.

With reference to the second aspect, in some implementations of the second aspect, the physical signal includes at least one of the following signals: a demodulation reference signal DMRS, a sounding reference signal SRS, a signal carried on a physical random access channel PRACH, a synchronization signal, a phase tracking reference signal PTRS, or a channel state information reference signal CSI-RS.

With reference to the second aspect, in some implementations of the second aspect, the second time unit is further configured to transmit data of a second service.

With reference to the second aspect, in some implementations of the second aspect, the second time unit corresponds to a parameter set, and the parameter set includes a parameter used to transmit the physical signal, and a parameter used to transmit the data of the first service or a parameter used to transmit the data of the second service; and the transmitting the physical signal in the second time unit includes: transmitting, by the network device, the physical signal and the data of the second service in the second time unit based on the parameter set.

With reference to the second aspect, in some implementations of the second aspect, the parameter set includes a first parameter set and a second parameter set, and the second time unit includes a third time subunit and a fourth time subunit; and the third time subunit corresponds to the first parameter set, and the fourth time subunit corresponds to the second parameter set; and the first parameter set includes the parameter used to transmit the data of the first service and the parameter used to transmit the physical signal, and the second parameter set includes the parameter used to transmit the data of the second service and the parameter used to transmit the physical signal; and the transmitting the physical signal in the second time unit includes: transmitting, by the network device, the physical signal in the third time subunit based on the first parameter set; and transmitting, by the first node, the data of the second service in the fourth time subunit based on the second parameter set.

According to a third aspect, an apparatus is provided. The apparatus is configured to perform the method in any one of the first aspect or the possible implementations of the first aspect. Specifically, the apparatus includes a unit configured to perform the method in any one of the first aspect or the possible implementations of the first aspect.

According to a fourth aspect, an apparatus is provided. The apparatus includes a transceiver, a memory, and a processor. The transceiver, the memory, and the processor communicate with each other through an internal connection path. The memory is configured to store instructions. The processor is configured to execute the instructions stored in the memory, to control a receiver to receive a signal and control a transmitter to send a signal. When the processor executes the instructions stored in the memory, the processor is enabled to perform the method in any one of the first aspect or the possible implementations of the first aspect.

According to a fifth aspect, a computer program product is provided. The computer program product includes computer program code. When the computer program code is run by a computing device, the computing device is enabled to perform the method in any one of the first aspect or the possible implementations of the first aspect.

According to a sixth aspect, a computer-readable medium is provided. The computer-readable medium is configured to store a computer program. The computer program includes instructions for performing the method in any one of the first aspect or the possible implementations of the first aspect.

According to a seventh aspect, a chip is provided. The chip includes a processor, configured to invoke a computer program from a memory and run the computer program, so that an apparatus on which the chip is installed performs the method in any one of the first aspect or the possible implementations of the first aspect.

BRIEF DESCRIPTION OF DRAWINGS

FIG. 1 is a schematic diagram of a communications system according to an embodiment of this application;

FIG. 2 is a schematic flowchart of a data transmission method according to an embodiment of this application;

FIG. 3 is a schematic diagram of transmission periodicity division according to an embodiment of this application;

FIG. 4 is another schematic diagram of transmission periodicity division according to an embodiment of this application;

FIG. 5 is a schematic flowchart of another data transmission method according to an embodiment of this application;

FIG. 6 is a schematic block diagram of an apparatus according to an embodiment of this application.

DESCRIPTION OF EMBODIMENTS

Figure 7:
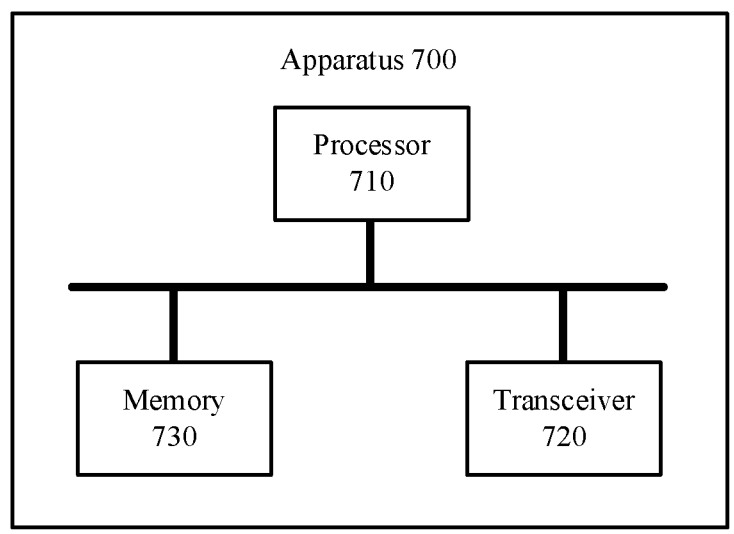
FIG. 7 is a schematic block diagram of another apparatus according to an embodiment of this application.

The following describes technical solutions of this application with reference to accompanying drawings.

The technical solutions in embodiments of this application may be applied to various communications systems, such as a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, and a future fifth generation (5G) system or new radio (NR) system.

FIG. 1 shows a communications system 100 to which an embodiment of this application is applied. The communications system 100 may include at least one network device 110. The network device 110 may be a device, for example, a base station or a base station controller that communicates with a terminal device. Each network device 110 may provide communication coverage for a specific geographical area, and may communicate with terminal devices within the coverage area (cell). The network device 110 may be a base transceiver station (BTS) in a global system for mobile communications (GSM) system or a code division multiple access (CDMA) system, or may be a NodeB (NB) in a wideband code division multiple access (WCDMA) system, or may be an evolved NodeB (eNB, or eNodeB) in an LTE system, or may be a radio controller in a cloud radio access network (CRAN) scenario. Alternatively, the network device may be a relay node, an access point, a vehicle-mounted device, a wearable device, or a network device in a future 5G network, for example, a gNodeB (gNB) or a transmission reception point TRP) in a new radio (new radio, NR) system. Alternatively, the network device 110 may be a network device in a future evolved public land mobile network (public land mobile network, PLMN) network, or the like. This is not limited in the embodiments of this application.

The wireless communications system 100 further includes one or more terminal devices 120 within the coverage of the network device 110. The terminal device 120 may be mobile or fixed. The terminal device 120 may be an access terminal, user equipment (UE), a subscriber unit, a subscriber station, a mobile station, a remote station, a remote terminal, a mobile device, a user terminal, a terminal, a wireless communications device, a user agent, or a user apparatus. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. This is not limited in the embodiments of this application.

In the embodiments of this application, the terminal device or the network device includes a hardware layer, an operating system layer running on the hardware layer, and an application layer running on the operating system layer. The hardware layer includes hardware such as a central processing unit (CPU), a memory management unit (MMU), and a memory (also referred to as a main memory). The operating system may be any one or more computer operating systems, for example, a Linux operating system, a Unix operating system, an Android operating system, an iOS operating system, or a Windows operating system, for implementing service processing by using a process. The application layer includes applications such as a browser, an address book, word processing software, and instant messaging software. In addition, a specific structure of an execution body of a method provided in the embodiments of this application is not specifically limited in the embodiments of this application, provided that a program that records code of the method provided in the embodiments of this application can be run to perform communication according to the method provided in the embodiments of this application. For example, the execution body of the method provided in the embodiments of this application may be the terminal device or the network device, or a functional module that can invoke and execute the program in the terminal device or the network device.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to: a magnetic storage component (for example, a hard disk, a floppy disk, or a magnetic tape), an optical disc (for example, a compact disc (CD), a digital versatile disc (DVD)), a smart card and a flash memory component (for example, erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry instructions and/or data.

FIG. 1 shows one network device and two terminal devices as an example. Optionally, the communications system 100 may include a plurality of network devices, and another quantity of terminal devices may be included in the coverage of one network device. This is not limited in this embodiment of this application.

Optionally, the wireless communications system 100 may further include other network entities such as a network controller and a mobility management entity. This is not limited in this embodiment of this application.

FIG. 2 is a schematic flowchart of an information transmission method 200 according to an embodiment of this application. The method 200 may be applied to the communications system 100 shown in FIG. 1. However, this embodiment of this application is not limited thereto. Optionally, the method 200 may be further applied to another communications system such as vehicle to X (V2X), device-to-device (D2D) direct communication (for example, communication between UEs), or relay communication.

S210. A first node determines a transmission periodicity, where the transmission periodicity includes a first time unit and a second time unit, data of a first service is transmitted only in the first time unit, and a physical signal is transmitted in the second time unit.

S220. The first node transmits the data of the first service in the first time unit, and/or transmits the physical signal in the second time unit.

According to the data transmission method in this embodiment of this application, the transmission periodicity for scheduling data transmission is divided into the first time unit and the second time unit, and the data of the first service is transmitted only in the first time unit, so that the data of the first service can be the only data transmitted in a period of time, interference caused by another signal to the data of the first service is reduced as much as possible, thereby helping improve data transmission reliability.

Optionally, the first time unit and the second time unit do not overlap in time domain. In other words, the first time unit and the second time unit do not include a same symbol in time domain.

The first node may be the network device 110 in the communications system 100, or may be the terminal device 120 in the communications system 100, or may be another node that has a data transmission function. This is not limited in this embodiment of this application. Specifically, the first node determines the transmission periodicity, the data of the first service is transmitted only in the first time unit in the transmission periodicity, and the physical signal is transmitted in the second time unit in the transmission periodicity. Therefore, the first node may transmit the data of the first service in the first time unit, and may transmit the physical signal in the second time unit; or may transmit both the data of the first service in the first time unit and the physical signal in the second time unit.

The transmission periodicity may be transmission duration, for example, may be a cyclic time (CT) or a plurality of CTs in the industrial Internet. This is not limited in this embodiment of this application. Generally, a length of the CT may be a predefined or preconfigured specific time length. For example, the length of the CT may be a value in a range of 0.25 ms to 2 ms, and a size of a service packet that can be transmitted in one CT may be a value in a range of 64 bytes to 1500 bytes. It should be understood that the transmission periodicity is merely a time segment in a data transmission process, and is not a specific time segment. For example, there are three transmission periodicities in time domain, which are respectively referred to as a first transmission periodicity, a second transmission periodicity, and a third transmission periodicity. In this case, there may be at least one transmission periodicity in the three transmission periodicities, and the at least one transmission periodicity includes a first time unit and a second time unit. Further, each of the three transmission periodicities may include the first time unit and the second time unit, the data of the first service may be transmitted not only in the first time unit in the first transmission periodicity, and the data of the first service may also be transmitted in the first time unit in the second transmission periodicity and/or the first time unit in the third transmission periodicity.

In this embodiment of this application, that the data of the first service is transmitted only in the first time unit means that the data of the first service is transmitted only in the first time unit in the transmission periodicity. It may be understood that a transmission behavior of the data of the first service beyond the transmission periodicity is not limited in this embodiment of this application. In other words, the data of the first service may be transmitted in a time unit beyond the transmission periodicity. In other words, for one or more transmission periodicities in time domain, the data of the first service is transmitted in the first time unit in the one or more transmission periodicities, and for another time unit beyond the one or more transmission periodicities, the data of the first service may be transmitted in the another time unit, or may not be transmitted in the another time unit. This is not limited in this embodiment of this application.

The first time unit and the second time unit each include several symbols. To be specific, the first time unit and the second time unit each may be an integer quantity of slots, or may be a fractional quantity of slots including an integer quantity of symbols, or may be an absolute time segment including an integer quantity of symbols, for example, 0.25 ms. This is not limited in this embodiment of this application.

In addition, the data of the first service may include data carried on at least one of the following physical channels: a first physical downlink shared channel (PDSCH), a first physical downlink control channel (PDCCH), a first physical uplink shared channel (PUSCH), or a first physical uplink control channel (PUCCH). For example, the data of the first service may include data carried on the first PDSCH and/or data carried on the first PDCCH. For another example, the data of the first service may include data carried on the first PUSCH and/or data carried on the first PUCCH. For still another example, the data of the first service may include data carried on the first PDSCH and/or data carried on the first PDCCH, and data carried on the first PUSCH and/or data carried on the first PUCCH. This is not limited in this embodiment of this application.

The first service may be a service that has a feature or requirement, for example, an enhanced mobile broadband (eMBB) service, an ultra-reliable and low latency communications (URLLC) service, or a massive machine type communications (mMTC) service. The eMBB service has a feature or requirement of a large data volume, the URLLC service has a feature or requirement of high reliability, and the mMTC service has a feature or requirement of wide coverage.

In an optional embodiment, when transmission is performed in the first time unit in the transmission periodicity, a time domain resource occupied by the data of the first service may cross a slot boundary.

Downlink transmission is used as an example. A time domain resource used for one downlink transmission includes four orthogonal frequency division multiplexing (OFDM) symbols, and the four OFDM symbols may cross two slots. For example, the four OFDM symbols may be two downlink OFDM symbols in a slot n and two downlink OFDM symbols in a slot n+1. If data carried on the PDSCH cannot be transmitted across the slot boundary in the first time unit, because two downlink OFDM symbols in the slot n are not enough for one data transmission, the first node needs to wait for the slot n+1 before starting the data transmission. Therefore, the first node needs to wait for a time of two symbols, and data transmission efficiency is relatively low. However, in this embodiment of this application, the data carried on the PDSCH may be transmitted across the slot boundary in the first time unit. This helps reduce a transmission latency and improve the data transmission efficiency.

In an optional embodiment, the first time unit in the transmission periodicity includes at least one slot, and the at least one slot may have the following characteristics: There may be more than two switching points in one slot, and the switching points may be used for switching from an uplink symbol to a downlink symbol, and/or switching from a downlink symbol to an uplink symbol. In this way, uplink and downlink data can be more flexibly transmitted between nodes, thereby improving the data transmission efficiency.

In a possible implementation of the foregoing switching point, the foregoing switching point is used for switching from the downlink symbol to the uplink symbol, that is, one switch from the downlink symbol to the uplink symbol may be considered as one switching point. For example, the first time unit may include two slots: the slot n and the slot n+1. A slot format of the slot n may be DFFUDFUDFUUUUU (including three switching points), and a slot format of the slot n+1 may be UUDFUUDFUDFUUU (including three switching points), where D is a downlink symbol (which is used to transmit the downlink data), U is an uplink symbol (which is used to transmit the uplink data), and F is a flexible symbol (which may be used to transmit the uplink data, or may be used to transmit the downlink data, or may be used to transmit neither the uplink data nor the downlink data). When the flexible symbol is used to transmit neither the uplink data nor the downlink data, the flexible symbol may be used for switching from the downlink symbol to the uplink symbol. Therefore, in this implementation, the flexible symbol may be considered as the foregoing switching point. However, it should be understood that, in this implementation, a quantity of switching points depends on a quantity of times of switching from the downlink symbol to the uplink symbol, and is irrelevant to a quantity of flexible symbols. The quantity of switching points is greater than 2, and the uplink symbol and the downlink symbol in the first time unit may be more flexibly configured, so that information exchange between nodes can be more flexible.

It should be understood that the foregoing transmission includes data sending or data receiving. In a possible implementation, the first node is a sending node. In this case, the first node may send the data of the first service by using the first time unit, and send the physical signal by using the second time unit. In another possible implementation, the first node is a receiving node. In this case, the first node may receive the data of the first service by using the first time unit, and receive the physical signal by using the second time unit. Optionally, when the sending node is a network device, the receiving node may be a terminal device or a network device. When the sending node is a terminal device, the receiving node may be a network device or a terminal device.

Optionally, the first time unit may be used to transmit only the data of the first service, or transmit the data of the first service and a demodulation reference signal (DMRS), where the DMRS is used by the receiving node to demodulate the data of the first service. In this way, in the first time unit, more time domain resources may be used to transmit the data of the first service. This helps reduce a transmission time of the data of the first service, thereby reducing a transmission latency. In addition, this helps reduce the time required for data retransmission and obtain more retransmission times, so that the data transmission reliability is improved.

In a possible implementation, transmission of the data of the first service and transmission of the physical signal are completely separated in time domain, thereby further avoiding interference from the physical signal with the data, and improving the data transmission reliability. In other words, the data of the first service is transmitted only in the first time unit, the physical signal is transmitted only in the second time unit, and the physical signal may be located at any position in the second time unit. For example, the physical signal is located at a start of the second time unit, at an end of the second time unit, or at the start and the end of the second time unit. This is not limited in this embodiment of this application either. The start and end herein may be absolute positions in the second time unit, or may be relative positions in the second time unit. For example, the start may be a position that is the earliest in the second time unit, or may be a position that is relatively early in the second time unit. For another example, the end may be a position that is the latest in the second time unit, or may be a position that is relatively late in the second time unit.

Optionally, in one transmission periodicity, if the DMRS in the physical signal needs to be used to demodulate the data of the first service, a position of the DMRS in the second time unit may depend on a relative position relationship between the first time unit and the second time unit. In other words, the network device may configure the position of the DMRS in the second time unit based on the relative position relationship between the first time unit and the second time unit. For example, in one transmission periodicity, if the first time unit is before the second time unit, the DMRS may be configured at the start of the second time unit; if the first time unit is after the second time unit, the DMRS may be configured at the end of the second time unit; or if the second time unit is located between two first time units, the DMRS may be configured at the start and the end of the second time unit. In this way, the receiving node can obtain the DMRS more quickly, and demodulate the data of the first service using the DMRS, thereby improving the data transmission efficiency.

In an optional embodiment, the method further includes: The first node receives first configuration information, where the first configuration information is used to configure at least one of the following: a length of the transmission periodicity, a position of the first time unit in the transmission periodicity, or a position of the second time unit in the transmission periodicity. Correspondingly, the second node sends the first configuration information. The second node may be the network device.

Specifically, the first node may determine the transmission periodicity based on the received first configuration information. The first configuration information may be used to configure at least one of the length of the transmission periodicity, the position of the first time unit in the transmission periodicity, or the position of the second time unit in the transmission periodicity. Information included in the first configuration information may be classified into the following several cases:

1. The first configuration information includes only the length of the transmission periodicity.

The first node may determine, based on the length of the transmission periodicity included only in the first configuration information, a predefined or preconfigured proportion (which may be a proportion of a length of the first time unit in the transmission periodicity, or may be a proportion of a length of the second time unit in the transmission periodicity, or may be a ratio of a length of the first time unit to a length of the second time unit), and in combination with predefined or preconfigured time sequence information (where the time sequence information is used to indicate a time sequence of the first time unit and the second time unit in the transmission periodicity), the position of the first time unit in the transmission periodicity and the position of the second time unit in the transmission periodicity.

2. The first configuration information includes only the position of the first time unit in the transmission periodicity.

The first node may determine the length of the transmission periodicity and the position of the second time unit in the transmission periodicity based on the first configuration information and the predefined proportion. Details are similar to details of the case 1, and details are not described herein again.

3. The first configuration information includes only the position of the second time unit in the transmission periodicity.

The first node may determine the length of the transmission periodicity and the position of the first time unit in the transmission periodicity based on the first configuration information and the predefined proportion. Details are similar to details of the case 1, and details are not described herein again.

4. The first configuration information includes the length of the transmission periodicity and the position of the first time unit in the transmission periodicity.

The first node may determine the position of the second time unit in the transmission periodicity based on the length of the transmission periodicity and the position of the first time unit in the transmission periodicity.

5. The first configuration information includes the length of the transmission periodicity and the position of the second time unit in the transmission periodicity.

The first node may determine the position of the first time unit in the transmission periodicity based on the length of the transmission periodicity and the position of the second time unit in the transmission periodicity.

6. The first configuration information includes the position of the first time unit in the transmission periodicity and the position of the second time unit in the transmission periodicity.

The first node may determine the length of the transmission periodicity based on the position of the first time unit in the transmission periodicity and the position of the second time unit in the transmission periodicity.

It should be understood that in the foregoing case 1 to case 6, the transmission periodicity includes the first time unit and the second time unit. In other words, the transmission periodicity includes only the first time unit and the second time unit.

Optionally, for the configuration methods in the foregoing case 1 to case 6, the time sequence relationship between the first time unit and the second time unit may be predefined or preconfigured. For example, in one transmission periodicity, the first time unit and the second time unit may be consecutive or inconsecutive in time domain. For another example, in one transmission periodicity, the time sequence relationship between the first time unit and the second time unit may be (in a time sequence): the first time unit and the second time unit; or the first time unit, the second time unit, and the first time unit; or the first time unit, the second time unit, the first time unit, and the second time unit.

In a possible implementation, as shown in FIG. 3, a transmission periodicity includes a first time unit and a second time unit, the first time unit is located before the second time unit, data of a first service is transmitted only in the first time unit, and a physical signal is transmitted in the second time unit. The data of the first service herein includes uplink data of the first service and/or downlink data of the first service.

Further, the lengths of the first time unit and the second time unit may be equal. If the transmission periodicity is one CT, the transmission periodicity shown in FIG. 3 may be applied to a service model 2 in the industrial Internet. The service model 2 means that data of a downlink service and data of an uplink service arrive at a start of the CT, the uplink data and/or the downlink data of the service lasts for a time length of half a CT, and reliability of 99.9999% is required for receiving data of the service. The second half the CT is a service-free time segment, and is used to transmit the physical signal in this embodiment of this application. Therefore, the first half the CT is the first time unit, and the second half the CT is the second time unit.

7. The first configuration information includes the length of the transmission periodicity, the position of the first time unit in the transmission periodicity, and the position of the second time unit in the transmission periodicity.

In the case 7, the transmission periodicity may include the first time unit and the second time unit, and may further include another time unit. This is not limited in this embodiment of this application.

The uplink data of the first service and the downlink data of the first service may be separately transmitted on different time domain resources. In an optional embodiment, the first time unit includes a first time subunit and a second time subunit, the first time subunit is used to transmit the downlink data of the first service, and the second time subunit is used to transmit the uplink data of the first service.

It should be understood that "transmit" in the embodiments of this application should be flexibly understood. To be specific, "transmit" sometimes has a meaning of "sending", and sometimes has a meaning of "receiving". When the first node is the terminal device, the terminal device may receive the downlink data of the first service in the first time subunit, and may send the uplink data of the first service in the second time subunit; and when the first node is the network device, the network device may send the downlink data of the first service in the first time subunit, and may receive the uplink data of the first service in the second time subunit.

It should be further understood that there may be one or more first time subunits. This is not limited in this embodiment of this application. When there are a plurality of first time subunits, the plurality of first time subunits may be consecutive in the first time unit, or may be inconsecutive in the first time unit. This is not limited in this embodiment of this application either. Similarly, there may be one or more second time subunits. When there are a plurality of second time subunits, the plurality of second time subunits may be consecutive in the first time unit, or may be inconsecutive in the first time unit.

In a possible implementation, as shown in FIG. 4, a transmission periodicity includes a first time unit and a second time unit, the first time unit includes a first time subunit and a second time subunit, the first time subunit is located before the second time unit, and the second time subunit is located after the second time unit. In this case, downlink data of a first service is transmitted only in the first time subunit, a physical signal is transmitted in the second time subunit, and uplink data of the first service is transmitted only in the second time subunit.

Further, a length of the first time unit may be equal to a length of the second time unit, and a length of the first time subunit may be equal to a length of the second time subunit. If the transmission periodicity is one CT, the transmission periodicity shown in FIG. 4 may be applied to a service model 1 in the industrial Internet. The service model 1 refers to a time length in which data of a downlink service arrives at a start of the CT and the data of the downlink service lasts for one fourth of the CT, reliability of 99.9999% is required for receiving data of the service. The data of the uplink service arrives at three quarters of the CT, the data of the uplink service lasts one fourth of the CT, and reliability of 99.9999% is required for receiving data of the service. One half in the middle of the CT is a service-free time segment, and is used to transmit a physical signal in this embodiment of this application. Therefore, the first quarter of the CT is a first time subunit, the last quarter of the CT is the second time subunit, and the half in the middle of the CT is a second time unit.

For example, the transmission periodicity may include an integer quantity of slots. In addition to configuring the first time unit and the second time unit, a second node (for example, the network device) may further configure slots in the transmission periodicity, a configured slot parameter may include at least one of the following parameters: a format of the slot, positions of a channel and a signal in the slot, a subcarrier spacing, a length of a cyclic prefix (CP), and the like. In different transmission periodicities, the foregoing slot parameters may be configured to be the same, or may be configured to be different. This is not limited in this embodiment of this application. It should be understood that configuring a same slot parameter for a plurality of different transmission periodicities can reduce signaling overheads required for configuration. The slot parameter may be semi-statically configured by the second node by using higher layer signaling, or dynamically configured by using physical layer signaling.

Optionally, the second node may configure the slot parameter by using at least one of radio resource control (RRC) signaling, media access control element (MAC CE) signaling, and downlink control information (DCI). For example, the second node may configure the slot parameter for the first node by using a combination of the RRC signaling and the DCI signaling. For another example, the second node may configure the slot parameter for the first node only by using the RRC signaling, the DCI signaling, or the MAC CE signaling.

In an optional embodiment, the first configuration information is further used to configure a position of the first time subunit and/or a position of the second time subunit.

In an optional embodiment, the method further includes: The first node receives second configuration information, where the second configuration information is used to configure the position of the first time subunit and/or the position of the second time subunit. Correspondingly, the second node sends the second configuration information. The second node may be the network device.

In this embodiment of this application, information used to configure the position of the first time subunit and/or the position of the second time subunit may be included in the first configuration information, or may be included in the additional second configuration information. This is not limited in this embodiment of this application.

In an optional embodiment, the physical signal includes at least one of the following signals: a demodulation reference signal (DMRS), a sounding reference signal (SRS), a signal carried on a physical random access channel (PRACH), a synchronization signal, a phase tracking reference signal (PTRS), or a channel state information reference signal (CSI-RS) signal.

Specifically, the synchronization signal may alternatively be a synchronization signal block. There may be a plurality of possible combinations of the foregoing physical signals.

For example, the signals included in the physical signal may be the DMRS, the SRS, the signal carried on the PRACH, the synchronization signal, the PTRS, and the CSI-RS. In this way, in a possible implementation, all physical signals are transmitted in the second time unit, and the first time unit is used to transmit only the data of the first service, so that a quantity of time domain resources used to transmit the data of the first service can be increased. In another possible implementation, the first time unit is used to transmit the data of the first service and some DMRSs used for data demodulation, so that a quantity of time domain resources used to transmit the data of the first service can also be increased. For another example, the signals included in the physical signal may be the SRS, the signal carried on the PRACH, the synchronization signal, the PTRS, and the CSI-RS, and all DMRSs used for demodulating the data of the first service may be transmitted in the first time unit. In this way, demodulation performance of the data of the first service in the first time unit can be better ensured.

In a possible implementation, uplink symbols in the second time unit may be used to transmit an uplink DMRS, an SRS, an uplink PTRS, and a signal carried on a PRACH, and downlink symbols in the second time unit may be used to transmit a downlink DMRS, a synchronization signal, a downlink PTRS, a CSI-RS, and the like.

The uplink DMRS may be used to demodulate uplink data in one or more predefined or preconfigured transmission periodicities. In other words, a transmission periodicity corresponding to uplink data that can be demodulated using the uplink DMRS in the second time unit of the current transmission periodicity may be configured through predefinition or pre-configuration. For example, if the one or more predefined or preconfigured transmission periodicities are the current transmission periodicity, the uplink DMRS may be used to demodulate the uplink data in the current transmission periodicity. For another example, if the one or more predefined or preconfigured transmission periodicities are a previous transmission periodicity of the current transmission periodicity, the uplink DMRS may be used to demodulate uplink data in the previous transmission periodicity. For still another example, if the one or more predefined or preconfigured transmission periodicities are a next transmission periodicity of the current transmission periodicity, the uplink DMRS may be used to demodulate uplink data in the next transmission periodicity. For yet another example, if the one or more predefined or preconfigured transmission periodicities are the current transmission periodicity and a next transmission periodicity of the current transmission periodicity, the uplink DMRS may be used to demodulate uplink data in the current transmission periodicity and demodulate uplink data in the next transmission periodicity.

Likewise, the downlink DMRS may be used to demodulate downlink data in one or more predefined or preconfigured transmission periodicities. In other words, a transmission periodicity corresponding to downlink data that can be demodulated by using the downlink DMRS in the second time unit of the current transmission periodicity may be configured through predefinition or pre-configuration. A case of the downlink DMRS is similar to a case of the uplink DMRS, and details are not described herein again.

The receiving node performs channel measurement based on a CSI-RS sent in the second time unit in the transmission periodicity, to obtain a channel measurement result, where the channel measurement result may be used to transmit data in a predefined or preconfigured transmission periodicity. For example, the channel measurement result may be used to transmit data in the current transmission periodicity, or may be used to transmit data in n transmission periodicities after the current transmission periodicity, where n is an integer greater than or equal to 1.

Generally, when unicast data is transmitted, at least one of a time domain resource, a frequency domain resource, a code domain resource, and a space domain resource used for DMRSs received by different nodes is different. For the first node, a DMRS received by the first node is used to demodulate unicast data of the first node, where the unicast data may be data scrambled using an identifier of the first node.

In an optional embodiment, when data transmission may be performed between a plurality of first nodes in the system and the second node, and transmission channels between the plurality of first nodes and the second node are correlated to some extent, the plurality of first nodes may use a same DMRS. In this case, the second node may send a group-level specific DMRS, used by the plurality of first nodes to demodulate the received data, where a scrambling identifier of the group-level specific DMRS is shared by the plurality of first nodes.

The group-level specific DMRS may be transmitted in the first time unit; or may be transmitted in the second time unit; or a part of the DMRS may be transmitted in the first time unit, and the other part of the DMRS is transmitted in the second time unit. This is not limited in this embodiment of this application. The same DMRS represents a same DMRS (that is, a group-level specific DMRS), and it may also be understood that a same resource is used to send DMRSs. The resource may include a time domain resource, a frequency domain resource, a code domain resource, a space domain resource, and the like.

The correlation between the channels may be understood as that channel states are similar. For example, when a distance between two first nodes is less than a threshold, it may be considered that the channels between the two first nodes and the second node are correlated, and a same DMRS may be used. The threshold may be predefined or preconfigured. It should be understood that the channel correlation may be alternatively reflected as another feature. This is not limited in this embodiment of this application.

Specifically, using data transmission between a base station and UE as an example. A plurality of UEs, including UE 1 and UE 2, exist in a coverage area of the base station, a channel between the base station and the UE 1 is correlated with a channel between the base station and the UE 2. The base station sends a group-level specific DMRS scrambled by a specific identifier, the UE 1 and the UE 2 receive the group-level specific DMRS, and may separately demodulate, by using the group-level specific DMRS, data sent by the base station. Using data transmission between the UEs as an example. Both the UE 1 and the UE 2 can perform data transmission with the UE 3, a channel between the UE 1 and UE 3 is correlated with a channel between the UE 2 and the UE 3, and the UE 1 and the UE 2 may use a group-level specific DMRS. After receiving the group-level specific DMRS, the UE 3 may descramble data by using a scrambling identifier of the group-level specific DMRS.

In an optional embodiment, the first node serves as a sending node. In a transmission periodicity, the first node sends the data of the first service to the second node in the first time unit in the transmission periodicity (which may be an $N^{th}$ transmission of the data of the first service, where N is an integer greater than or equal to 1). When the first node receives a negative acknowledgment (negative acknowledgement, NACK) fed back by the second node, the first node needs to retransmit the data of the first service (in other words, the data of the first service is transmitted for an $(N+1)^{th}$ time). A retransmission time may be in the first time unit of the current transmission periodicity, or may be in the first time unit of a transmission periodicity after the current transmission periodicity. This depends on a configuration of the retransmission time by the network device. In this embodiment of this application, there may be the following three cases for the DMRS used for the data of the first node during the $N^{th}$ transmission and the $(N+1)^{th}$ transmission.

1. The first node sends the data of the first service and the DMRS during the $N^{th}$ transmission, and sends only the data of the first service but does not send the DMRS during the $(N+1)^{th}$ transmission. In this way, the second node may demodulate, by using the DMRS received during the $N^{th}$ transmission, the data of the first service transmitted at the $N^{th}$ time and the data of the first service transmitted at the $(N+1)^{th}$ time.
2. The first node sends only the data of the first service but does not send the DMRS during the $N^{th}$ transmission, and sends the DMRS and the data of the first service during the $(N+1)^{th}$ transmission. In this way, the second node may demodulate, by using the DMRS received during the $(N+1)^{th}$ transmission, the data of the first service transmitted at the $N^{th}$ time and the data of the first service transmitted at the $(N+1)^{th}$ time.
3. The first node sends the data and the DMRS of the first service during both the $N^{th}$ transmission and the $(N+1)^{th}$ transmission. In this way, the second node may demodulate, by using the DMRS received during the $N^{th}$ transmission, the data of the first service transmitted at the $N^{th}$ time, and demodulate, by using the DMRS received during the $(N+1)^{th}$ transmission, the data of the first service transmitted at the $(N+1)^{th}$ time.

In an optional embodiment, the second time unit is further used to transmit data of a second service. In other words, the first node may transmit the data of the second service and the physical signal in the second time unit.

The data of the second service may include data carried on at least one of the following physical channels: a second PDSCH, a second PDCCH, a second PUSCH, or a second PUCCH. For example, the data of the second service may include data carried on the second PDSCH and/or data carried on the second PDCCH. For another example, the data of the second service may include data carried on the second PUSCH and/or data carried on the second PUCCH. For still another example, the data of the second service may include data carried on the second PDSCH and/or data carried on the second PDCCH, and data carried on the second PUSCH and/or data carried on the second PUCCH. This is not limited in this embodiment of this application.

For example, in this embodiment of this application, data carried on different PDCCH may be scrambled by using different radio network temporary identifiers (RNTI). For example, the data carried on the first PDCCH may be scrambled by using a first RNTI, and the data carried on the second PDCCH may be scrambled by using a second RNTI. The first RNTI and the second RNTI are different RNTIs.

In addition, for example, different PDSCHs may occupy different quantities of symbols in time domain. For example, in a data transmission process, non-slot based scheduling is used for the data carried on the first PDSCH, and a minimum quantity of scheduling symbols in one data transmission may be two, four, or seven. In this way, the first PDSCH occupies two, four, or seven symbols in time domain. Slot based scheduling is used for the data carried on the second PDSCH, and a minimum quantity of scheduling symbols in one data transmission may be 14. In this way, the second PDSCH occupies 14 symbols in time domain. It may be understood that the quantities of symbols occupied by the first PDSCH and the second PDSCH in time domain are merely examples. A specific quantity of symbols occupied by the first PDSCH and a specific quantity of symbols occupied by the second PDSCH in time domain are not limited in this embodiment of this application.

The second service may be a service that has a feature or requirement, and the second service is different from the first service. For example, the first service is an eMBB service, and the second service is a URLLC service. Optionally, data carried on a PDCCH corresponding to the eMBB service may be scrambled by using the first RNTI, and data carried on a PDCCH corresponding to the URLLC service may be scrambled by using the second RNTI. Optionally, non-slot based scheduling may be used for data carried on a PDSCH corresponding to the eMBB service, and slot based scheduling may be used for data carried on a PDSCH corresponding to the URLLC service; alternatively, slot based scheduling may be used for data carried on a PDSCH corresponding to the eMBB service, and non-slot based scheduling may be used for data carried on a PDSCH corresponding to the URLLC service.

Optionally, the physical signal is used to transmit the data of the first service and/or transmit the data of the second service.

Specifically, a physical signal is transmitted in a second time unit in a transmission periodicity. The physical signal may be used to transmit data of a first service in the transmission periodicity; or may be used to transmit data of a second service in the transmission periodicity; or may be not only used to transmit data of a first service in the transmission periodicity, but also used to transmit data of a second service in the transmission periodicity. This is not limited in this embodiment of this application.

For example, the physical signal transmitted in the second time unit in the transmission periodicity is a DMRS. The DMRS may be used to demodulate the data of the first service in the transmission periodicity; or may be used to demodulate the data of the second service in the transmission periodicity; or may be not only used to demodulate the data of the first service in the transmission periodicity, but also used to demodulate the data of the second service in the transmission periodicity.

For another example, the physical signal transmitted in the second time unit in the transmission periodicity is a CSI-RS. A channel measurement result based on the CSI-RS may be used to transmit the data of the first service in the transmission periodicity; or may be not only used to transmit the data of the second service in the transmission periodicity, but also used to transmit the data of the second service in the transmission periodicity. In the foregoing two cases, the second time unit is located before the first time unit in time domain. Alternatively, the channel measurement result based on the CSI-RS may be used to transmit the data of the second service in the transmission periodicity.

In an optional embodiment, the second time unit corresponds to a parameter set, and the parameter set includes a parameter used to transmit the physical signal, and a parameter used to transmit the data of the first service or a parameter used to transmit the data of the second service; and the transmitting the physical signal in the second time unit includes: transmitting, by the first node, the physical signal and the data of the second service in the second time unit based on the parameter set.

Specifically, the second time unit may be configured to correspond to the parameter set, where the parameter set may include the parameter used to transmit the physical signal and the parameter used to transmit the data of the first service, or the parameter set may include the parameter used to transmit the physical signal and the parameter used to transmit the data of the second service. The first node may transmit the physical signal and the data of the second service in the second time unit based on the parameter set. To be specific, the first node may transmit the physical signal in the second time unit based on the parameter used to transmit the physical signal, and transmit the data of the second service based on the parameter used to transmit the data of the first service or the parameter used to transmit the data of the second service.

Optionally, the parameter set is also referred to as a numerology. It should be understood that a numerology is a set of parameters used for communication between nodes in a communications system. The communications system (for example, 5G) may support a plurality of numerologies. A numerology may include a subcarrier spacing, a cyclic prefix (cyclic prefix, CP), a unit of time, bandwidth, and the like. For example, a numerology may include the subcarrier spacing and the CP.

The subcarrier spacing may be an integer greater than 0. For example, the subcarrier spacing may be 15 kHz, 30 kHz, 60 kHz, 120 kHz, 240 kHz, or 480 kHz. Alternatively, the subcarrier spacing may be another value. This is not limited in this embodiment of this application.

CP information may include a time length of the CP and/or a type of the CR The type of the CP may be a normal CP (NCP) or an extended CP (ECP). Generally, an NCP time length is 4.7 µs, and an ECP time length is 4.2 µs.

The unit of time is used to indicate a time unit in time domain, for example, a sampling point, a symbol, a mini-slot, a slot, a subframe, a half-frame, or a radio frame.

The bandwidth may be a segment of contiguous or non-contiguous resources in frequency domain, and may also be referred to as a bandwidth part (BWP), a carrier bandwidth part, subband bandwidth, narrowband bandwidth, or another name, and a name of this application is not limited in this embodiment of this application.

It should be understood that there may be one or more parameter sets. When a plurality of parameter sets are configured, different time segments in the second time unit may respectively correspond to different parameter sets. The foregoing correspondences between different time segments and different parameter sets may be predefined or preconfigured. The first node may perform data transmission in a specific time segment by using a parameter set corresponding to the time segment.

In an optional embodiment, the parameter set includes a first parameter set and a second parameter set, and the second time unit includes a third time subunit and a fourth time subunit; and the third time subunit corresponds to the first parameter set, and the fourth time subunit corresponds to the second parameter set; and the first parameter set includes the parameter used to transmit the data of the first service and the parameter used to transmit the physical signal, and the second parameter set includes the parameter used to transmit the data of the second service and the parameter used to transmit the physical signal; and the transmitting the physical signal in the second time unit includes: transmitting, by the first node, the physical signal in the third time subunit based on the first parameter set; and the method further includes: The first node transmits, in the fourth time subunit based on the second parameter set, the data of the second service.

It should be understood that there may be one or more third time subunits. This is not limited in this embodiment of this application. When there are a plurality of third time subunits, the plurality of third time subunits may be consecutive in the second time unit, or may be inconsecutive in the second time unit. This is not limited in this embodiment of this application either. Similarly, there may be one or more fourth time subunits. When there are a plurality of fourth time subunits, the plurality of fourth time subunits may be consecutive in the second time unit, or may be inconsecutive in the second time unit.

In another optional embodiment, the downlink symbol in the second time unit may correspond to one or more parameter sets, and the uplink symbol in the second time unit may correspond to one or more parameter sets, a symbol that transmits neither the uplink data nor the downlink data in the second time unit may correspond to one or more parameter sets. The correspondence between the symbol and the parameter set may be predefined or preconfigured. The first node may perform data transmission on a specific symbol by using a parameter set corresponding to the symbol. In this way, uplink and downlink resource configuration flexibility is improved, and resource utilization is improved.

Further, for example, a relatively large subcarrier spacing may be configured for a symbol on which neither uplink data nor downlink data is transmitted. In this way, a time length of the symbol is relatively short. If uplink-downlink switching is performed by using these symbols on which neither uplink data nor downlink data is transmitted, switching overheads of the first node can be reduced.

FIG. 5 is a schematic flowchart of another information transmission method 500 according to an embodiment of this application. The method 500 may be applied to the communications system 100 shown in FIG. 1, but this embodiment of this application is not limited thereto. Optionally, the method 500 may be further applied to another communications system such as V2X or D2D direct communication (for example, communication between UEs), or relay communication.

S510. A first node determines a transmission periodicity, where the transmission periodicity includes a first time unit and a second time unit, data of a first service is transmitted in the first time unit, and a physical signal is transmitted in the second time unit.

S520. The first node transmits the data of the first service in the first time unit, and/or transmits the physical signal in the second time unit.

According to the data transmission method in this embodiment of this application, the transmission periodicity for scheduling data transmission is divided into the first time unit and the second time unit, and the data of the first service is transmitted in the first time unit in the transmission periodicity, so that the data of the first service can be centrally, e.g., the only data, transmitted in a period of time, interference caused by another signal to the data of the first service is reduced as much as possible, thereby helping improve data transmission reliability.

It should be understood that another possible implementation of this embodiment of this application is similar to that of the method 200. For details, refer to the description in the method 200. Details are not described herein again. Further, the data of the first service may be transmitted in the first time unit in the transmission periodicity, or may be transmitted in the second time unit in the transmission periodicity, or may be transmitted in another time unit beyond the transmission periodicity. This is not limited in this embodiment of this application. A specific transmission manner of the data of the first service in the first time unit (or the second time unit, or another time unit) is similar to the specific transmission manner of the data of the second service in the second time unit. Details are not described herein again.

It should be understood that sequence numbers of the foregoing processes do not indicate an execution sequence. The execution sequence of the processes should be determined based on functions and internal logic of the processes, and should not be construed as any limitation on an implementation process of the embodiments of this application.

The foregoing describes in detail the data transmission methods according to the embodiments of this application with reference to FIG. 1 to FIG. 5. The following describes in detail apparatuses according to the embodiments of this application with reference to FIG. 6 and FIG. 7.

FIG. 6 shows an apparatus 600 according to an embodiment of this application. The apparatus corresponds to the first node in the foregoing embodiment. Specifically, the apparatus 600 may be a terminal device, or may be a chip in a terminal device. The apparatus may be a network device, or may be a chip in a network device. The apparatus 600 includes a processing unit 610 and a transceiver unit 620.

The processing unit 610 is configured to determine a transmission periodicity, where the transmission periodicity includes a first time unit and a second time unit, data of a first service is transmitted only in the first time unit, and a physical signal is transmitted in the second time unit.

The transceiver unit 620 is configured to transmit the data of the first service in the first time unit, and/or transmit the physical signal in the second time unit.

According to the apparatus in this embodiment of this application, the transmission periodicity for scheduling data transmission is divided into the first time unit and the second time unit, and the data of the first service is transmitted only in the first time unit, so that the data of the first service can be centrally transmitted in a period of time, interference caused by another signal to the data of the first service is reduced as much as possible, thereby helping improve data transmission reliability.

Optionally, the first time unit and the second time unit do not overlap in time domain.

Optionally, the transceiver unit 620 is further configured to receive first configuration information, where the first configuration information is used to configure at least one of the following: a length of the transmission periodicity, a position of the first time unit in the transmission periodicity, or a position of the second time unit in the transmission periodicity.

Optionally, the first time unit includes a first time subunit and a second time subunit, the first time subunit is used to transmit uplink data of the first service, and the second time subunit is used to transmit downlink data of the first service.

Optionally, the transceiver unit 620 is further configured to receive second configuration information, where the second configuration information is used to configure a position of the first time subunit and/or a position of the second time subunit.

Optionally, the physical signal includes at least one of the following signals: a demodulation reference signal DMRS, a sounding reference signal SRS, a signal carried on a physical random access channel PRACH, a synchronization signal, a phase tracking reference signal PTRS, or a channel state information reference signal CSI-RS.

Optionally, the second time unit is further configured to transmit data of a second service.

Optionally, the physical signal is used to transmit the data of the first service and/or transmit the data of the second service.

Optionally, the second time unit corresponds to a parameter set, and the parameter set includes a parameter used to transmit the physical signal, and a parameter used to transmit the data of the first service or a parameter used to transmit the data of the second service.

The transceiver unit 620 is specifically configured to transmit the physical signal and the data of the second service in the second time unit based on the parameter set.

Optionally, the parameter set includes a first parameter set and a second parameter set, and the second time unit includes a third time subunit and a fourth time subunit; and the third time subunit corresponds to the first parameter set, and the fourth time subunit corresponds to the second parameter set; and the first parameter set includes the parameter used to transmit the data of the first service and the parameter used to transmit the physical signal, and the second parameter set includes the parameter used to transmit the data of the second service and the parameter used to transmit the physical signal; and the transceiver unit 620 is specifically configured to: transmit the physical signal in the third time subunit based on the first parameter set; and transmit the data of the second service in the fourth time subunit based on the second parameter set.

It should be understood that, the apparatus 600 herein is presented in a form of functional units. The term "unit" herein may be an application-specific integrated circuit (ASIC), an electronic circuit, a processor (for example, a shared processor, a dedicated processor, or a group processor) configured to execute one or more software or firmware programs and a memory, a merged logic circuit, and/or another proper component that supports the described functions. In an optional example, a person skilled in the art may understand that the apparatus 600 may be specifically the first node in the foregoing embodiments. The apparatus 600 may be configured to perform procedures and/or steps in the foregoing method embodiment that correspond to the first node. To avoid repetition, details are not described herein again.

The apparatus 600 in the foregoing solutions has a function of implementing a corresponding step performed by the first node in the foregoing method. The function may be implemented by hardware, or may be implemented by hardware by executing corresponding software. The hardware or the software includes one or more modules corresponding to the foregoing function. For example, a sending unit may be replaced with a transmitter, a receiving unit may be replaced with a receiver, and another unit such as a determining unit may be replaced with a processor, to respectively perform a sending operation, a receiving operation, and a related processing operation in the method embodiments.

In this embodiment of this application, the apparatus in FIG. 6 may alternatively be a chip or a chip system, for example, a system on chip (SoC). Correspondingly, the receiving unit and the sending unit may be a transceiver circuit of the chip. This is not limited herein.

FIG. 7 shows another apparatus 700 according to an embodiment of this application. The apparatus 700 includes a processor 710, a transceiver 720, and a memory 730. The processor 710, the transceiver 720, and the memory 730 communicate with each other through an internal connection path. The memory 730 is configured to store instructions. The processor 710 is configured to execute the instructions stored in the memory 730, to control the transceiver 720 to send a signal and/or receive a signal.

The processor 710 is configured to determine a transmission periodicity, where the transmission periodicity includes a first time unit and a second time unit, data of a first service is transmitted only in the first time unit, and a physical signal is transmitted in the second time unit. The transceiver 720 is configured to transmit the data of the first service in the first time unit, and/or transmit the physical signal in the second time unit.

It should be understood that the apparatus 700 may be specifically the first node in the foregoing embodiment, and may be configured to perform steps and/or procedures corresponding to the first node in the foregoing method embodiments. Optionally, the memory 730 may include a read-only memory and a random access memory, and provide instructions and data to the processor. A part of the memory may further include a non-transitory random access memory. For example, the memory may further store information about a device type. The processor 710 may be configured to execute the instructions stored in the memory; and when the processor 710 executes the instructions stored in the memory, the processor 710 is configured to perform each step and/or procedure of the method embodiment corresponding to the first node.

It should be understood that in the embodiments of this application, the processor in the foregoing apparatus may be a central processing unit (CPU), or the processor may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor, or the processor may be any conventional processor, or the like.

In a possible implementation, the memory 730 may be included in the processor 710. Alternatively, it may be understood that the processor 710 may perform a function of storing the instructions by the memory 730. This is not limited in this embodiment of this application.

In an implementation process, the steps in the foregoing methods may be completed by using a hardware integrated logic circuit in the processor or instructions in a form of software. The steps of the methods disclosed with reference to the embodiments of this application may be directly performed by a hardware processor, or may be performed by using a combination of hardware in the processor and a software unit. The software unit may be located in a mature storage medium in the art, such as a random access memory, a flash memory, a read-only memory, a programmable read-only memory, an electrically erasable programmable memory, or a register. The storage medium is located in the memory, and the processor executes the instructions in the memory and completes the steps in the foregoing method in combination with the hardware of the processor. To avoid repetition, details are not described herein.

It should be understood that the term "and/or" in this specification describes only an association relationship between associated objects and indicate that three relationships may exist. For example, A and/or B may indicate the following three cases: Only A exists, both A and B exist, and only B exists. In addition, the character "/" in this specification usually indicates an "or" relationship between the associated objects.

A person of ordinary skill in the art may be aware that, method steps and units described in the embodiments disclosed in this specification may be implemented by electronic hardware, computer software, or a combination thereof. To clearly describe interchangeability between the hardware and the software, the foregoing has generally described steps and compositions of each embodiment based on functions. Whether these functions are implemented in hardware or software depends on specific applications of the technical solutions and design constraints. A person of ordinary skill in the art may use different methods to implement the described functions for each particular application, but it should not be considered that the implementation goes beyond the scope of this application.

A person skilled in the art may clearly understand that, for the purpose of convenient and brief description, for detailed working processes of the foregoing system, apparatus, and unit, refer to corresponding processes in the foregoing method embodiments, and details are not described herein again.

In the several embodiments provided in this application, it should be understood that the disclosed system, apparatus, and method may be implemented in other manners. For example, the described apparatus embodiments are merely examples. For example, division into the units is merely logical function division. There may be another division manner in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate. Parts displayed as units may or may not be physical units, which may be located in one position, or may be distributed on a plurality of network units. Some or all of the units may be selected based on actual requirements to achieve the objectives of the solutions of the embodiments of this application.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of this application essentially, or the part contributing to a current technology, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of this application. The foregoing storage medium includes any medium that can store program code, for example, a USB flash drive, a removable hard disk, a read-only memory (ROM), a random access memory (RAM), a magnetic disk, or an optical disc.

The foregoing descriptions are merely specific embodiments of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. An apparatus, comprising:
one or more processors;
a memory coupled to the one or more processors, wherein the memory stores a program to be executed by the one or more processors, the program including instructions for:
determining a transmission periodicity, wherein the transmission periodicity comprises a first time unit and a second time unit; wherein in the transmission periodicity, data of a first service is transmitted only in the first time unit, a physical signal is transmitted in the second time unit, and the first time unit and the second time unit do not overlap in time domain; and wherein the second time unit is further configured to transmit data of a second service; and
performing at least one of:
transmitting the data of the first service in the first time unit; or
transmitting the physical signal and the data of the second service in the second time unit, and
wherein the program further includes instructions for:
receiving first configuration information, wherein the first configuration information is used to configure at least one of the following:
a length of the transmission periodicity, a position of the first time unit in the transmission periodicity, or a position of the second time unit in the transmission periodicity.

2. The apparatus according to claim 1, wherein the physical signal is used to transmit at least one of the data of the first service or the data of the second service.

3. The apparatus according to claim 1, wherein the second time unit corresponds to a parameter set, and the parameter set comprises a parameter used to transmit the physical signal, and a parameter used to transmit the data of the first service or a parameter used to transmit the data of the second service; and
the transmitting the physical signal and the data of the second service in the second time unit comprises:
transmitting the physical signal and the data of the second service in the second time unit based on the parameter set.

4. The apparatus according to claim 3, wherein the parameter set comprises a first parameter set and a second parameter set, and the second time unit comprises a third time subunit and a fourth time subunit; and the third time subunit corresponds to the first parameter set, and the fourth time subunit corresponds to the second parameter set; and the first parameter set comprises the parameter used to transmit the data of the first service and the parameter used to transmit the physical signal, and the second parameter set comprises the parameter used to transmit the data of the second service and the parameter used to transmit the physical signal; and
the transmitting the physical signal and the data of the second service in the second time unit comprises:
transmitting, based on the first parameter set, the physical signal in the third time subunit; and
transmitting, based on the second parameter set, the data of the second service in the fourth time subunit.

5. The apparatus according to claim 1, wherein the first time unit comprises a first time subunit and a second time subunit, the first time subunit is used to transmit downlink data of the first service, and the second time subunit is used to transmit uplink data of the first service.

6. The apparatus according to claim 5, wherein the program further includes instructions for:

receiving second configuration information, wherein the second configuration information is used to configure at least one of a position of the first time subunit or a position of the second time subunit.

7. A method, comprising:
determining a transmission periodicity, wherein the transmission periodicity comprises a first time unit and a second time unit; wherein in the transmission periodicity, data of a first service is transmitted only in the first time unit, a physical signal is transmitted in the second time unit, and the first time unit and the second time unit do not overlap in time domain; and wherein the second time unit is further configured to transmit data of a second service; and
performing at least one of:
transmitting the data of the first service in the first time unit; or
transmitting the physical signal and the data of the second service in the second time unit; and
receiving first configuration information, wherein the first configuration information is used to configure at least one of the following:
a length of the transmission periodicity, a position of the first time unit in the transmission periodicity, or a position of the second time unit in the transmission periodicity.

8. The method according to claim 7, wherein the physical signal is used to transmit at least one of the data of the first service or the data of the second service.

9. The method according to claim 7, wherein the second time unit corresponds to a parameter set, and the parameter set comprises a parameter used to transmit the physical signal, and a parameter used to transmit the data of the first service or a parameter used to transmit the data of the second service; and
the transmitting the physical signal and the data of the second service in the second time unit comprises:
transmitting the physical signal and the data of the second service in the second time unit based on the parameter set.

10. The method according to claim 9, wherein the parameter set comprises a first parameter set and a second parameter set, and the second time unit comprises a third time subunit and a fourth time subunit; and the third time subunit corresponds to the first parameter set, and the fourth time subunit corresponds to the second parameter set; and the first parameter set comprises the parameter used to transmit the data of the first service and the parameter used to transmit the physical signal, and the second parameter set comprises the parameter used to transmit the data of the second service and the parameter used to transmit the physical signal; and
the transmitting the physical signal and the data of the second service in the second time unit comprises:
transmitting, based on the first parameter set, the physical signal in the third time subunit; and
transmitting, based on the second parameter set, the data of the second service in the fourth time subunit.

11. The method according to claim 7, wherein the first time unit comprises a first time subunit and a second time subunit, the first time subunit is used to transmit downlink data of the first service, and the second time subunit is used to transmit uplink data of the first service.

12. The method according to claim 11, further comprising:
receiving second configuration information, wherein the second configuration information is used to configure at least one of a position of the first time subunit or a position of the second time subunit.

13. A non-transitory computer readable medium, wherein the non-transitory computer readable medium stores instructions that are executable by a computer, and the instructions comprise instructions for:
determining a transmission periodicity, wherein the transmission periodicity comprises a first time unit and a second time unit; wherein in the transmission periodicity, data of a first service is transmitted only in the first time unit, a physical signal is transmitted in the second time unit, and the first time unit and the second time unit do not overlap in time domain; and wherein the second time unit is further configured to transmit data of a second service; and
performing at least one of:
transmitting the data of the first service in the first time unit; or
transmitting the physical signal and the data of the second service in the second time unit, and
wherein the instructions further include instructions for:
receiving first configuration information, wherein the first configuration information is used to configure at least one of the following:
a length of the transmission periodicity, a position of the first time unit in the transmission periodicity, or a position of the second time unit in the transmission periodicity.

14. The non-transitory computer readable medium according to claim 13, wherein the second time unit corresponds to a parameter set, and the parameter set comprises a parameter used to transmit the physical signal, and a parameter used to transmit the data of the first service or a parameter used to transmit the data of the second service; and
the transmitting the physical signal and the data of the second service in the second time unit comprises:
transmitting the physical signal and the data of the second service in the second time unit based on the parameter set.

15. The non-transitory computer readable medium according to claim 14, wherein the parameter set comprises a first parameter set and a second parameter set, and the second time unit comprises a third time subunit and a fourth time subunit; and the third time subunit corresponds to the first parameter set, and the fourth time subunit corresponds to the second parameter set; and the first parameter set comprises the parameter used to transmit the data of the first service and the parameter used to transmit the physical signal, and the second parameter set comprises the parameter used to transmit the data of the second service and the parameter used to transmit the physical signal; and
the transmitting the physical signal and the data of the second service in the second time unit comprises:
transmitting, based on the first parameter set, the physical signal in the third time subunit; and
transmitting, based on the second parameter set, the data of the second service in the fourth time subunit.

16. The non-transitory computer readable medium according to claim 13, wherein the first time unit comprises a first time subunit and a second time subunit, the first time subunit is used to transmit downlink data of the first service, and the second time subunit is used to transmit uplink data of the first service.

17. The non-transitory computer readable medium according to claim 16, wherein the instructions further comprise instructions for:

receiving second configuration information, wherein the second configuration information is used to configure at least one of a position of the first time subunit or a position of the second time subunit.

\* \* \* \* \*

UNITED STATES PATENT AND TRADEMARK OFFICE
CERTIFICATE OF CORRECTION

| | |
|---|---|
| PATENT NO. | : 11,991,684 B2 |
| APPLICATION NO. | : 17/241434 |
| DATED | : May 21, 2024 |
| INVENTOR(S) | : Xinxian Li et al. |

It is certified that error appears in the above-identified patent and that said Letters Patent is hereby corrected as shown below:

In the Claims

In Column 28, Line 20, in Claim 1, delete "unit," and insert -- unit; --.

In Column 30, Line 20, in Claim 13, delete "unit," and insert -- unit; --.

Signed and Sealed this
Thirtieth Day of July, 2024

Katherine Kelly Vidal
*Director of the United States Patent and Trademark Office*